June 16, 1925.
K. SCHEMBER ET AL
1,542,478
SALES CONTROL APPARATUS
Filed Aug. 9, 1921     3 Sheets-Sheet 1
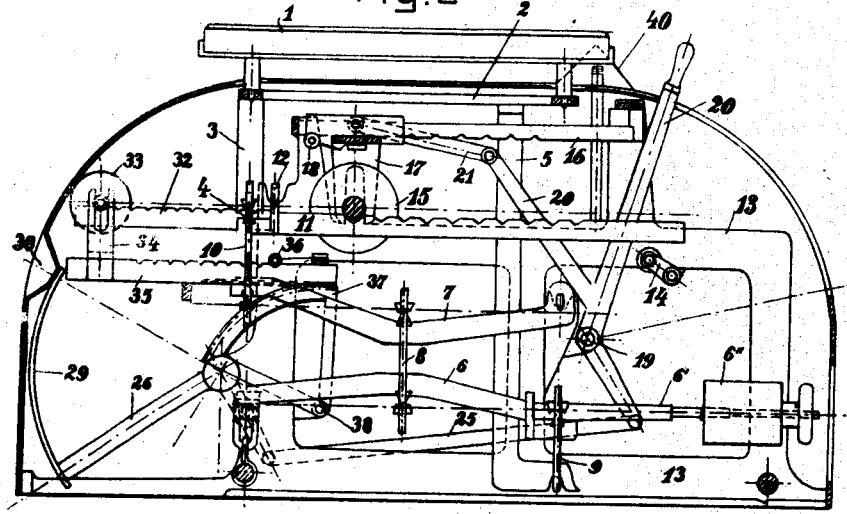

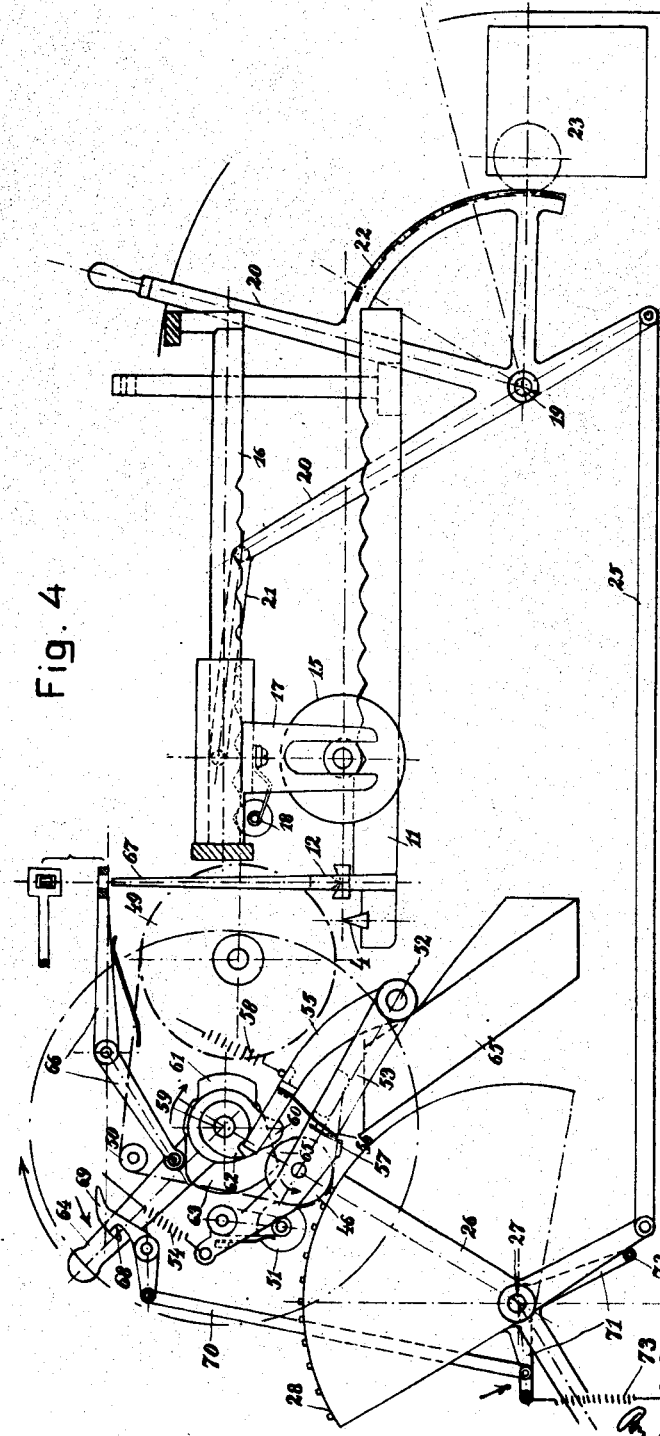

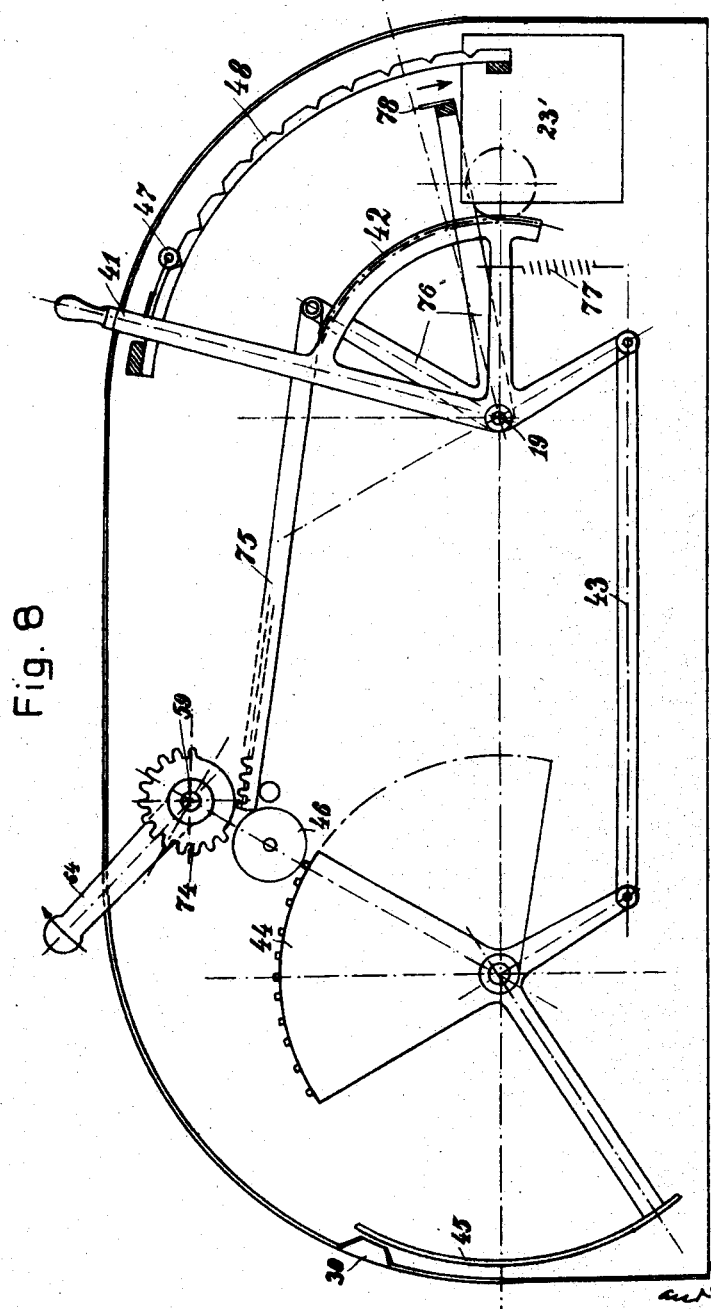

Patented June 16, 1925.

1,542,478

UNITED STATES PATENT OFFICE.

KORNELIUS SCHEMBER, OF VIENNA-ATZGERSDORF, AUSTRIA, AND RUDOLF JOKSCH, OF PRAGUE-KAROLINENTHAL, CZECHOSLOVAKIA.

SALES-CONTROL APPARATUS.

Application filed August 9, 1921. Serial No. 490,844.

*To all whom it may concern:*

Be it known that we, KORNELIUS SCHEMBER, a citizen of the Republic of Austria, and residing at Vienna-Atzgersdorf, Austria, and RUDOLF JOKSCH, a citizen of the Republic of Czechoslovakia, and residing at Prague-Karolinenthal, Czechoslovakia, have invented certain new and useful Improvements in a Sales-Control Apparatus (for which we have applied for patent in Austria on March 7, 1920, and in Germany on March 8, 1920), of which the following is a specification.

For the systematic carrying on of any sales business a strict control of the money taken and of the goods coming in and going out is indispensable. The supervision of the sums of money received in the sale of the goods dealt with by weight in businesses conducted on modern principles can certainly be effected by cash registers of well-known construction, yet the proprietor of the business and also the purchaser are entirely dependent on the skill of the salesman employed in the business in respect of the correct weight of the goods sold.

Our invention is designed to eliminate this serious fault. It relates to a sales control apparatus with a weight, kind of goods and price-indicating device in which there is used the travelling poise arrangement with automatic notch-adjustment as disclosed in our application for patent filed on June 9th, 1920, Ser. No. 387,769, for determining the weight of the material to be weighed placed on the weighing machine and in which this travelling poise arrangement is positively connected with a counting or adding mechanism, and also with a card printing-device in such a manner that both the weight, kind of goods and price of each individual weighing can be read off or printed on a card, as also the total of the weights and prices of all the successive weighings in any given period can be read off from the adding mechanism. The sales control apparatus can moreover be provided with other registering devices, e. g., an indicator to indicate which salesman attended to the sale, the kind of goods, number of articles, unit of the sales, packing number, date, etc.

The sales control apparatus according to the present invention is moreover so arranged that the above mentioned registrations can only take place when both an exact weighing of the goods placed on the weighing machine and therefore the exact operation of the weight indicator has been obtained, and also the device for indicating the kind of goods and price has been set. The sales control apparatus thus precludes any intentional or unintentional false weighing or falsification of the indications of weight, kind of goods and price.

On the accompanying drawings showing by way of example how the invention may be carried into practice, Figure 1 is an elevation of the weighing apparatus assumed to be standing on a table or sales counter with the front side turned towards the salesman;

Figure 2 is a vertical longitudinal section;

Figure 3 is the side turned towards the purchaser;

Figures 4–7 show details of the mechanism, while

Figure 8 is a longitudinal section through the goods and price registering arrangement.

The weighing machine and the registering devices are enclosed in a metal casing. Above the casing there is the weighbridge or weighing pan 1 which rests on the bridge carrier 2 by means of pins that extend through the casing with a suitable amount of clearance. The bridge carrier 2 is supported partly by the bracket 3 mounted on the load knife-edges 4 of the steelyard and partly on the bracket 5 which is suspended in a stirrup-strap 9 on the one armed lever 6. Since the brackets 3 and 5 are arranged in duplicate a stable support of the weighing bridge at four points is provided. The loads in the brackets 5 are transmitted unreduced through the lever 6, stirrup-strap 8, lever 7 and stirrup strap 10 back to the load knife edges 4 of the steelyard. The lever 6 carries on an arm 6' the taring weight 6'' adjustable by means of a milled nut, this weight serving for the accurate adjustment of the unloaded balance. The wire knife edge 12 of the steelyard 11 is mounted in the frame-shaped standard 13, which also contains the bearings and supports of all the other parts of the weighing machine and of the registering devices. The steelyard 11 is provided with the travelling poise with automatic notch adjustment as described and claimed in our above said application Serial Number 387,769 of June 9, 1920, and can be held fast or released by means of the detent 14 actuated by a handle arranged outside the protective casing. The travelling poise 15, which is made hollow, is moved in order to effect the weighing from notch to notch of the steelyard 11 until balance is obtained, this being done by means of the adjusting device 17 which is movable on a horizontal notched bar 16 rigidly secured to the frame 13. The roller 18 fixed on the adjusting device and sliding elastically on the notches of the bar 16 effects the automatic accurate setting of the adjusting device 17 on to the next notch, when the adjusting device is only approximately moved to this notch. The movement of the adjusting device 17 takes place, in the embodiment here shown, by means of an adjusting lever 20, which is capable of turning on the shaft 19 fixed in the frame 13, and one of which is pivotally connected to the adjusting device 17 by means of the link 21. The handle of the lever 20 extends out of the casing being guided in a slot in the casing, Figure 1. On the casing near the slot there are the figures giving the weights corresponding to the several positions of the lever. The lever 20 has moreover a toothed segment 22 (Figure 4), which is so connected to a gear wheel of an adding or counting mechanism 23 of well-known construction, that it will operate in the well-known manner. The counting mechanism 23 differs from other well-known constructions of such mechanism only in this that it is likewise provided (see the section and elevation in Figure 7) with an elastically supported roller 23' for the feed wheel of each of its sections, which roller engages in the correspondingly shaped notches of the wheel 24 and consequently effects the accurate adjustment of the feed wheel when as with the hand lever 20 the adjustment has only been approximative. Just as the adjusting device 17 is set by the action of its spring roller on the next adjacent graduation, so the feed wheel of the counting mechanism is set by the action of its spring roller on the adjacent figure. Both adjustments however according to the embodiment above described are positively interconnected. By the employment of the spring roller instead of an ordinary leaf spring, an easy almost frictionless operation of the feed-member is obtained. To the setting lever 20 there is also pivotally connected by means of the link 25 (Figure 4) the type and reading off frame 26, which is mounted to turn in bearings on the shaft 27 fixed in the frame 13 and bears a type-segment 28 provided with raised figure types and the reading off segment 29 guided past the window 30 (Figure 2) of the casing. The segment 29 is provided with readily visible figures, which appear at the window of the casing, as shown in Figure 3.

For the purpose of effecting rough and fine weighing on the weighing machine, a plurality of the travelling poise arrangements with automatic notch adjustment can be employed on one and the same weighing machine. For example, the first arrangement is provided or designed with a travelling poise for whole kilograms, the second for tenths of kilograms, and the third for hundredths of kilograms or even smaller weights. Each arrangement has then its own setting lever and connected mechanisms of the construction previously described. In the present embodiment, three travelling poise arrangements are arranged side by side and their three steelyards 11 on a common axis of oscillation 12, as also the setting levers 20 of the several arrangements are pivotally mounted side by side on a common shaft 19. In Fig. 1, the arrangement of the three setting levers 20 can be seen. Instead of the figures for the several positions of the setting levers near the guide-slots, by mounting engraved segments or wheels on the setting levers the arrangement may also be such that the figures corresponding to the weight values of the positions of the levers appear side by side in the windows or view holes above the guide slots (Figure 5). In order that the values on the reading off devices to which the latter have been set shall appear both arranged on the front side of the weighing machine (Figure 1) turned towards the salesman, and also on the purchaser's side (Figure 3), for the purpose of rapidly reading off the weight without error from the left to the right, the connection of the setting levers 20 with their corresponding type- and reading off segments 26 takes place in the manner shown in perspective in Figure 6. Consequently the link 25 of the setting lever 20 shown at the left in Fig. 6 for the whole kilogram is connected by a short bolt 31 to the corresponding type segment 26 which is at the right in Fig. 6 and the link of the setting lever 20' arranged at the right in Fig. 6 is connected to its corresponding segment 26' by a long bolt 31'.

In order that goods may be weighed and registered in vessels on the weighing machine so as to give only their net weights, the steelyard 11 is provided with a graduated and notched taring arm 32 (Figure 2), which in the same manner as the weighing arrangement itself bears a rolling weight 33 that is moved by the adjusting device 34 fixed to the rack bar 35. The rack 35 is provided on its upper edge with notches which are arranged at exactly the same distances apart and are equal in number to those on the taring arm 32. In these notches engages the roller 36 which is elastically mounted on the frame. The toothed lower edge of the rack 35 engages with the toothed segment 37 which is keyed to the shaft 38 and is rotated by means of the hand wheel 39 which is likewise fixed to the shaft 38 and is outside the casing Fig. 1. The taring of the empty vessel placed on the weighing machine thus takes place by turning the hand-wheel in one or the other direction, until the pointers or indicators of the weighing machine oscillate. These pointers are visible by the purchaser and salesman through the windows 40 (Figure 3) of the casing.

In order to register the kind and selling price of the weighed goods, there are also mounted on the same shaft 19 (Figure 4) forming the axis of oscillation of the weight setting lever 20, the kind of goods and price setting lever 41 (see the longitudinal section Figure 8 and side elevation Figure 1) which in respect of the motion transmission gear connecting them to the reading off and registering device and to the adding mechanism respectively are made quite similar to the weight setting lever. Accordingly the toothed segment 42 fixed to the lever 41 engages to the toothed feed-wheel of the associated adding mechanism 23' whilst the link 43 is again in pivotal connection with the type sector 44 or with the reading off segment 45, and the figures or characters produced on the reading off segment come into view according to the position of the lever 41 at the window 30. In order to obtain an accurate setting of the types on the type sector 44 relatively to the printing roller 46 or of the reading off segment at the window 30, a spring roller 47 (Fig. 8) is mounted on the setting lever 41 and engages in the notches of the guide segment 48 as soon as it is brought only approximately to the notch by the movement of the setting lever. By this means the rapid adjustment of the several levers for the kinds of goods and price to the desired positions is much facilitated and the whole mechanism, as compared with the complicated key-board heretofore usual has the advantage of very great simplicity and certainty of operation. In the embodiment shown here by way of example, the first (from left to right in Figure 1) setting lever 41 is assumed to be for indicating the kind of goods, the three next setting levers for dollars etc. for hundreds, tens and units and finally the two last setting levers for cents (tens and units). Near the guide-slots for the setting levers are arranged the letters or figures corresponding to the positions of the levers.

In order to be able, after use of the above described setting lever, to print on cards the weights obtained, the kind of goods and price of the goods weighed, there is provided the printing and cutting off mechanism shown in Figure 4.

A paper strip arranged on the drum 49 and shown in dotted lines is conducted over the guide roller 50 to the printing roller 46 and is resiliently pressed on to the latter by means of the roller 51 which is mounted so as to swing laterally. The printing roller 46 is mounted in a fork 53 which is capable of oscillating on a bolt 52 and is drawn up by the tension spring 54. On the bolt 52 there is moreover pivotally mounted the cut-off lever 55 which bears the shearing knife 56. The coacting blade 57 is on the fork 53. The cut-off arm 55, under the action of the spring 58, tends to move upwards. On the crank shaft 59 are keyed the cams 60, 61, 62 and 63. The end of the shaft 59 extending beyond the side wall of the casing bears the crank handle 64 whereby the whole printing mechanism is set in operation. The cam 60 at the beginning of the turning of the crank in the direction of the arrow, presses on the abutment surface 65 on the fork 53 and thus brings the printing roller 46 up to the type sectors, until their raised types impress themselves into the paper strip extending round the printing roller. In the further rotation of the crank 64, the cam 60 leaves the abutment surface 65, whereupon the fork 53 is again drawn up by the spring 54. In the meantime the concentric sector 61 has moved the printing roller 46 on by simple friction through a definite angle, whereby the paper strip is moved a definite length in the direction of the arrow to the right (towards the shearing knife). In the continued forward movement of the crank the sector 61 leaves the printing roller 46, whereby the latter is again brought to rest, whilst the cam 62 presses down the cut-off lever 55 and thus effects the cutting off of the fed forward length of the paper strip provided with all the desired impressions. This cut off piece falls into the guide channel 65' and through it slides out of the casing. In the further rotation of the crank, the cam 62 leaves the cut-off lever 55, whereupon the latter is raised by the spring 58. The crank is meanwhile returned after a complete revolution to its initial position.

In order to prevent printing of the weight before accurate weighing is complete, there is keyed on the crank shaft 59 the cam 63, on which slides the end of the two-armed safety lever 66, such end being provided with a roller. The other end of the safety lever is provided with a window, which before the beginning of the turning of the crank stands exactly over the point of a tongue 67 which is rigidly connected to the steelyard 11. This window shaped end of the safety lever 66 can however only swing down when the steelyard 11 is in the counter balancing position, i. e., when the tongue 67 is exactly vertical. In any other case, the safety lever 66 will engage the point of the tongue 67 and will thus be unable to swing downwards and so prevents a rotation of the cam 63 and consequently also of the crank shaft 59. Since now the printing of the weight only takes place in the rotation of the crank, no printing of the weight can occur until correct weighing has been effected.

Moreover in order to prevent use of the printing device and the registration of an already determined weighing of goods before the kind and the selling price of the already weighed goods has been made visible by means of the corresponding setting lever, a further automatic detent is provided for the crank. It consists of an abutment 68, which is fixed to the crank lever and is adapted to engage with the pawl 69. The pawl 69 is connected through the link 70 to the bell crank lever 71 which bears an abutment pin 72. The pawl 69 and bell crank lever 71, by the action of the spring 73, continually tend to turn in the direction of the arrows. The stop pin 72 extends beyond the arms of the sectors 26 of all the kind-of-goods and price-indicating devices. If the indicating devices are not used, the disengagement of the pawl 69 from the abutment 68 does not take place, and the lever 64 cannot turn, whereby printing of a weight without indicating the kind of goods and the price is impossible.

In order rapidly, automatically and positively to return all the setting levers and the reading off and registering devices to their original position after weighing and registering or after completion of the printing and ejection of the card, the hand lever is also connected to the returning device shown in Figure 8. On the crank shaft 59 there is also keyed the gear wheel 74 which engages in the rack 75. The rack is pivotally connected to the returning device 76 which is made in the form of a bell crank lever and is continuously drawn downwards by means of the spring 77. The gear wheel 74 is only toothed over two thirds of its periphery, on the remaining third the teeth being removed, so that at the initial position of the crank there is no engagement with the rack 75. Engagement only takes place when the crank is turned so far that the printing wheel 60 (Figure 4) by depressing the printing roller 46 has effected the printing of the weight, price, etc., obtained and the printing roller has moved up again. At this moment, the engaging teeth of the gear wheel 74 carry along with them the rack 75, the returning lever is drawn upwards against the direction of the arrow and by means of its striking bar 78 returns all the setting levers and consequently all the other indicating devices to their original positions. In the meantime the crank handle 64 has returned to its initial position, consequently the toothless section of the gear wheel 74 reaches the rack 75 whereby the engagement is interrupted and the freed returning lever 76 flies back under the action of the spring 77 in the direction of the arrow. By this means the setting levers 20 and 41 are released for a fresh weighing.

The above described arrangements can obviously be employed for weighing all kinds of products, and also the possibility of separate use of the weighing machine and of the indicators for kinds of goods and price is afforded.

We claim as our invention:

1. In combination with a closed casing having slots and a steelyard weighing mechanism in said casing provided with travelling poises and means for adjusting the same, a weight registering device, a pivoted setting lever extending through one of said slots in the said casing and operatively connected with the said adjusting means and the said weight-registering device so as to operate the same upon each adjustment, indicating devices for indicating and registering respectively the kinds and prices of the goods sold, additional pivoted setting levers on the same shaft with said first mentioned setting lever and also extending through others of said slots in the said casing, and means operatively connecting the said additional setting levers with the said registering devices.

2. The combination as set forth in claim 1, comprising also notched guide segments for said additional setting levers, and elastically mounted rollers on said levers adapted to engage the notches in said guide segments.

3. In combination with a closed casing having slots and a window, and a steelyard weighing mechanism in said casing provided with travelling poises and means for adjusting the same, a weight registering device, a pivoted setting lever extending through one of said slots in the said casing and operatively connected with the said adjusting means and the said weight-registering device so as to operate the same upon each adjustment, additional pivoted setting levers on the same shaft with the said first mentioned setting lever, oscillating type sectors and reading-off sectors for indicating and registering the kinds and prices of goods, means for operatively connecting said type sectors and reading-off sectors with the said additional setting levers, the symbols on said reading-off sectors being adapted to become visible through a window in said casing.

4. The combination as set forth in claim 3, comprising also notched guide-segments for said additional setting levers, and elastic rollers provided on said levers to engage the notches in the said guide-segments.

5. The combination as set forth in claim 3, comprising also a printing roller adapted to cooperate with the said type-sectors, a continuous strip of paper, guide-rollers therefor, a movable bracket carrying the said printing roller, and adapted to move said printing roller against said type sectors, and means for operating said movable bracket and printing roller, and means for feeding said strip of paper after each impression.

6. The combination as set forth in claim 3, comprising also a printing roller adapted to cooperate with the said type-sectors, a continuous strip of paper, guide-rollers therefor, a movable bracket carrying the said printing roller, and adapted to move said printing roller against said type sectors, and means for operating said movable bracket and printing roller, and means for feeding said strip of paper after each impression, a device for severing the printed part of said paper strip, means for moving said printed part in the path of the said severing device, and means for automatically operating the latter.

7. The combination as set forth in claim 3, comprising also a printing roller adapted to cooperate with the said type-sectors, a continuous strip of paper, guide rollers therefor, a movable bracket carrying the said printing roller, and adapted to move said printing roller against said type sectors, means for operating said movable bracket and printing roller, and means for feeding said strip of paper after each impression,—the said two last-named means comprising a system of cams, a common shaft carrying said cams, and a crank arm on said shaft outside the said casing for rotating said shaft.

8. The combination as set forth in claim 3, comprising also a printing roller adapted to cooperate with the said type-sectors, a continuous strip of paper, guide-rollers therefor, a movable bracket carrying the said printing roller, and adapted to move said printing roller against said type sectors, means for operating said movable bracket and printing roller, and means for feeding said strip of paper after each impression, the said two last-named means comprising a system of cams, a common shaft carrying said cams, and a crank arm on said shaft outside the said casing for rotating said shaft, a part rigidly connected with the steelyard of the weighing mechanism, a safety lever adapted to co-operate with one of the said cams and to engage the said rigid part, when the said steelyard is not balanced so as to prevent the rotation of the said cam shaft.

9. In combination with a closed casing having slots and a steelyard weighing mechanism therein provided with travelling poises and means for adjusting the same, a weight registering device, a pivoted setting lever extending through one of said slots in the said casing and operatively connected with the said adjusting means and the said weight-registering device so as to operate the same upon each adjustment, a graduated notched taring arm provided on the said steelyard, a travelling poise, an adjusting device therefor, a rack-bar secured to said adjusting device, a toothed segment in mesh with said rack-bar, and a hand-wheel outside the said casing for operating the said segment and thereby the said rack-bar.

10. The combination as set forth in claim 1, comprising additional counting mechanisms, and means on the said additional setting levers for operating the said additional counting mechanisms.

11. In combination with a closed casing having slots and a window, and a steelyard weighing mechanism in said casing provided with travelling poises and means for adjusting the same, a weight registering device, a pivoted setting lever extending through one of said slots in the said casing and operatively connected with the said adjusting means and the said weight-registering device so as to operate the same upon each adjustment, additional pivoted setting levers on the same shaft with the said first mentioned setting lever, oscillating type sectors and reading-off sectors for indicating and registering the kinds and prices of goods, means for operatively connecting said type sectors and reading-off sectors with the said additional setting levers, the symbols on said reading-off sectors being adapted to become visible through a window in said casing, a printing roller adapted to cooperate with the said type-sectors, a continuous strip of paper, guide-rollers therefor, a movable bracket carrying the said printing roller, and adapted to move said printing roller against said type-sectors, means for operating said movable bracket and printing roller, means for feeding said strip of paper after each impression, the said two last-named means comprising a system of cams, a common shaft carrying said cams, and a crank arm on said shaft outside the said casing for rotating said shaft,—and means on said crank arm and on the shaft of the said type-sectors and reading-off sectors operatively so connected as to prevent operation of type-sectors and reading-off sectors to re-print and re-register already weighed goods.

12. The combination as set forth in claim 11, comprising also means for automatically returning all the setting levers, registering and reading-off sectors to their original positions.

In testimony whereof we have hereunto set our hands in presence of two subscribing witnesses.

KORNELIUS SCHEMBER
RUDOLF JOKSCH.

Witnesses:
ROBERT THEO,
RINGAUD SHAFFER.